US006451141B1

(12) United States Patent
Krobb et al.

(10) Patent No.: US 6,451,141 B1
(45) Date of Patent: *Sep. 17, 2002

(54) PRODUCTION OF SEALS AND COATING AND THE BONDING OF TILES OR FLOOR COVERINGS

(75) Inventors: Joachim Krobb, Landau; Peter Fickeisen, Dirmstein; Bernd Däumer, Bad Dürkheim; Jürgen Barwich, Neustadt; Eckehardt Wistuba, Bad Dürkheim, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,043

(22) Filed: Mar. 9, 1998

(30) Foreign Application Priority Data

Mar. 10, 1997 (DE) .......................... 197 09 723

(51) Int. Cl.$^7$ ................................. E04B 2/00
(52) U.S. Cl. ...................... 156/71; 156/332; 427/207.1; 524/500
(58) Field of Search .................. 156/71, 332; 524/500; 427/207.1

(56) References Cited

U.S. PATENT DOCUMENTS

| 4,971,649 | A | * | 11/1990 | Aydin et al. ................... 156/71 |
| 5,073,611 | A | | 12/1991 | Rehmer et al. |
| 5,196,468 | A | | 3/1993 | Schwerzel et al. |
| 5,217,552 | A | * | 6/1993 | Miyajima et al. .............. 156/71 |
| 5,434,009 | A | * | 7/1995 | Urbanek ..................... 428/489 |
| 5,688,853 | A | * | 11/1997 | Salter et al. ................. 524/500 |

FOREIGN PATENT DOCUMENTS

| CA | 21 82 743 | | 8/1995 | |
| DE | 43 24 357 | | 11/1994 | |
| EP | 0 395 990 | | 11/1990 | |
| EP | 0 490 191 | | 6/1992 | |
| EP | 0 743 965 | | 11/1996 | |
| JP | 63-99274 | * | 4/1988 | ................. 524/500 |
| WO | WO 95/21884 | | 8/1995 | |

OTHER PUBLICATIONS

T.G. Fox, Bull. Am. Phys. Soc. (Sec. II), p. 123, "Influence of Diluent and of Copolymer Composition on the Glass Temperature of a Polymer System", 1956.
Brandrup, J., et al., Polymer Handbook, 2$^{nd}$ edition, Table of Contents, 1975.
Derwent Abstracts, DE 4,324,357, Nov. 03, 1994.

* cited by examiner

Primary Examiner—John J. Gallagher
(74) Attorney, Agent, or Firm—Oblon, Spivak, McClelland, Maier & Neustadt, P.C.

(57) ABSTRACT

The invention relates to a method of producing seals and coatings, and of bonding tiles and floor coverings, in which aqueous dispersions containing at least 20% by weight of filler and comprising a polymer mixture of a) an acrylate polymer A having a K value of from 5 to 55 and a glass transition temperature of below −10° C. and b) an acrylate copolymer having a glass transition temperature of from −50 to +50° C., are applied as sealants, coating materials or single-side adhesives. The compositions which are used, based on the filler-containing dispersions of the polymer mixture, are notable in processing for improved fixing in the wet and dry state, high heat stability, good adhesion to rubber and, since they are essentially free from organic solvents, plasticizers and resins, by a high level of environment-friendliness.

28 Claims, No Drawings

PRODUCTION OF SEALS AND COATING AND THE BONDING OF TILES OR FLOOR COVERINGS

BACKGROUND OF THE INVENTION

1. Field of the Invention

The production of seals and coatings and the bonding of tiles or floor coverings The invention relates to methods of producing seals and coatings and of bonding tiles or floor coverings by applying compositions based on aqueous acrylate copolymer dispersions which have a filler content of at least 20% by weight and which are free from major amounts of volatile organic solvents, plasticizers and modified or unmodified natural resins of low molecular mass. The invention also relates to the use of such compositions as sealants, coating materials or single-side adhesives (adhesives for one-sided application).

2. Description of the Background

The development of new kinds of polymer dispersions based on acrylate more than 25 years ago saw a significant turning point in the processing of sealants and in the work involved in laying tiles and floor coverings. It was possible to provide the processor with sealants, coating materials or single-side adhesives in whose processing the risks were very greatly reduced relative to the processing of the rubber solutions which had been dominant up to that time, since only 5% rather than 75% of flammable solvents were released. Sealants, and single-side adhesives used for tiles or floor coverings, differ fundamentally from pressure-sensitive adhesives in their use and in the properties which are required for that use. Pressure-sensitive adhesives are, in general, systems having an overall high surface tack and are unfilled systems, i.e. contain no fillers. In contrast to sealants and single-side adhesives they are applied as thin films (film thicknesses of about 20 to 200 $\mu$m) and for this reason alone require very different polymer mechanics. The requirements for single-side adhesives are application of the composition to one side only, and also the ability to correct the laid tiles or floor coverings in the course of processing, the ability to remove fresh residues of composition from the tiles or floor coverings and from the tools using water, and also excellent aging resistance. These special requirements have also led to special test standards, such as the testing of peel and shear strength and the testing of the wet bonding capacity and the dry gripping capacity.

The aqueous, acrylate copolymer-based dispersions which it has been possible to obtain commercially to date as sealants or for the fixed laying of tiles or floor coverings include not only at least 20 percent by weight of filler but also relatively large amounts of organic solvents and/or plasticizers, a part of which escapes into the atmosphere as the system sets, or they include a relatively large proportion of low molecular mass resins, such as balsam resins or colophony resins. The presence of these resins, however, is a problem since they may—as compounds of low molecular mass—migrate, can be washed out, cause color changes, owing for example to oxidation or to impurities in the mixture, reduce the polymer strength, or else may be toxicologically objectionable.

SUMMARY OF THE INVENTION

It is an object of the present invention to discover improved compositions, based on aqueous acrylate copolymer dispersions containing at least 20% by weight of filler, for the production of seals, coatings, including impregnated systems, and for the bonding of tiles or floor coverings, which compositions comprise as far as possible no volatile organic solvents, plasticizers or low molecular mass resins, such as natural resins or modified natural resins, and which do not have the abovementioned disadvantages of the aqueous acrylate copolymer dispersions currently used for the methods, or which have such disadvantages only to a markedly reduced extent.

DETAILED DESCRIPTION OF THE PREFERRED EMBODIMENT

We have found that this object can be achieved, by applying compositions based on aqueous acrylate copolymer dispersions, containing at least 20% by weight of fillers, as sealants, coating materials (including impregnating materials) or single-side adhesives, if use is made of a filler-containing aqueous dispersion of a polymer mixture comprising a) a polymer A having a K value of from 5 to 55 and a glass transition temperature of below −10° C., containing at least 50% by weight of copolymerized acrylic ester units, and b) a polymer B which is an acrylate copolymer having a glass transition temperature of from −50 to +50° C.

The invention accordingly provides a method of producing seals and coatings, including impregnated systems, and of bonding tiles or floor coverings by applying an acrylate copolymer dispersion which has a filler content of at least 20% by weight and which is free from major amounts of organic solvents, plasticizers and modified or unmodified natural resins of low molecular mass, which comprises applying an aqueous dispersion, containing at least 20% by weight of filler, of a polymer mixture comprising a) a polymer A having a K value of from 5 to 55 and a glass transition temperature of below −10° C., at least 50% by weight of which comprises copolymerized units of at least one ester of acrylic acid, and b) a polymer B which is an acrylate copolymer having a glass transition temperature of from −50 to +50° C.

The use of filler-containing aqueous acrylate copolymers as solvent-free single-side adhesives for floor coverings is known from EP-A 490 191. The compositions described therein, although free from solvent, necessarily include, however, a plasticizer and a resin. (Filler-containing aqueous acrylate copolymers for checked floor coverings, which are essentially free from organic solvents, plasticizers and resins, are described in EP-A 743 965. The dispersions described therein of acrylate polymers having glass transition temperatures of less than −25° C. correspond to the preferred polymers B in accordance with the present invention. EP-A 743965 does not describe a novel mixture of the polymers B with the polymers A.) In comparison to the dispersions of polymers B described in EP-A 743 965, the dispersions of the novel mixtures of the polymers B with the polymers A have improved processing properties when used as single-side adhesives for floor coverings, in terms of better fixing in the wet and dry state and of freedom from odor. Furthermore, they have surprising advantages in respect of adhesion to rubber and of a particularly high heat stability.

The dispersions used in accordance with the invention contain preferably less than 3% by weight, in particular less than 1% by weight, of the abovementioned solvents, plasticizers and natural resins. With particular preference they are completely free from these components.

The polymers A used in accordance with the invention for the mixture with the polymers B have a K value of from 5 to 55, (preferably from 5 to 30,) and a (glass transition temperature of below −10) and preferably from −20 to −60° C. and contain at least 50% by weight of copolymerized units of at least one ester of acrylic acid. (The polymers A have a polydispersity $M_w/M_n$ of from 1 to 10, and preferably from 1 to 5, which is a measure of the breadth of the molecular weight distribution of the respective polymer.)

(The K values of the polymers used in accordance with the invention are determined in accordance with DIN 53726 in a 1% strength by weight solution in tetrahydrofuran at 25° C.) The glass transition temperature $T_g$ is determined with the aid of the DSC (Differential Scanning Calorimetry) method in accordance with ASTM 3418/82. For copolymers it can be calculated in approximation from the glass transition temperatures of the homopolymers of the corresponding monomers by the equation of Fox (T. G. Fox, Bull. Am. Phys. Soc. (Ser.II) 1 (1956) 123)

$$\frac{1}{Tg} = \frac{X^1}{Tg^1} + \frac{X^2}{Tg^2} + \cdots + \frac{X^s}{Tg^s},$$

where $X^1, X^2, \ldots X^s$ are the mass fractions of the monomers 1 to s and $Tg^1, Tg^2, \ldots Tg^s$ are the glass transition temperatures of the homopolymers of the respective monomers 1 to s in kelvins. The glass transition temperatures of the homopolymers of common monomers are known and can be found in the technical literature, for example in J. Brandrup, E. H. Immergut, Polymer Handbook, 2nd Ed., J. Wiley, New York 1975.

The (polydispersity $M_w/M_n$) is determined by the customary methods of gel permeation chromatography, carrying out molar mass calibration with polystyrene.

The polymer A is in most cases a liquid polymer which may also be in the form of a fine aqueous secondary dispersion. Highly suitable polymers A contain, in copolymerized form, a) from 70 to 99% by weight of acrylates which form homopolymers having glass transition temperatures of from −30 to −60° C. and preferably from −40 to −60° C., b) from 1 to 30% by weight of carboxyl- and possibly hydroxyl-containing, olefinically unsaturated, copolymerizable monomers, and c) from 0 to 29% by weight of other olefinically unsaturated, copolymerizable monomers.

Also very advantageous are polymers A which comprise, in copolymerized form, a) from 85 to 98% by weight of alkyl acrylates, which form homopolymers having a glass transition temperature of from −40 to −60° C., and b) from 2 to 15% by weight of carboxyl- and possibly hydroxyl-containing monomers.

Examples of suitable monomers a) are n-butyl acrylate, n-hexyl acrylate, 2-ethylhexyl acrylate, decyl acrylate and dodecyl acrylate. Examples of suitable monomers b) are monoolefinically unsaturated, copolymerizable carboxylic acids having 3 to 5 C atoms, their anhydrides and monoesters, such as acrylic acid, methacrylic acid, maleic acid, fumaric acid, itaconic acid, maleic anhydride and mono-butyl maleate. Examples of suitable monomers b) containing hydroxyls are 2-hydroxyethyl acrylate and methacrylate, hydroxypropyl acrylate and methacrylate and 4-hydroxybutyl acrylate and methacrylate. Suitable monomers c) are vinyl esters of monocarboxylic acids having 2 to 18 C atoms, such as vinyl acetate or vinyl propionate, acrylates and methacrylates not included in a), such as methyl methacrylate or ethyl acrylate, vinyl- and alkenylaromatic monomers having 8 to 18 C atoms, such as styrene, α-methylstyrene or vinyltoluene, amides of olefinically unsaturated carboxylic acids having 3 to 5 C atoms, such as acrylamide or methacrylamide, N-vinyl monomers, such as N-vinylpyrrolidone or N-vinylcaprolactam and amino-containing olefinically unsaturated monomers, such as dimethylaminoethyl acrylate or dimethylaminobutyl acrylate. Acrylate copolymers A which comprise carboxyl-containing monomers such as acrylic or methacrylic acid in amounts from 1 to 10 and, preferably, from 1 to 5% by weight in copolymerized form are particularly advantageous. The nature and amounts of the monomers in mixtures should be chosen so as to give polymers A which meet the provisos in respect of monomer amounts and glass transition temperatures of the polymers. It has proven judicious to prepare the polymer A with properties such that it markedly increases the tack of the mixture M after the drying thereof.

The polymers A can be (prepared in a manner known per se:) for the preparation of polymers A having a very narrow molecular weight distribution ($M_w/M_n$ close to 1) a known process of high-temperature polymerization should be employed. (The polymers A are preferably prepared by polymerization in bulk or in solution at from 60 to 220° C. possibly using, for solution polymerization, customary organic solvents) such as hydrocarbons (e.g. toluene), alcohols (e.g. isobutanol), esters (e. g. ethyl acetate) or ketones (e. g. methyl ethyl ketone) with appropriate boiling ranges or establishing the relatively high polymerization temperature in closed reactors under pressure (up to 15 bar) in the case of volatile solvents. The customary polymerization initiators can be employed, in known amounts. In view of the (desired low K values and molecular weights of the polymers A) it is sensible to use polymerization regulators, such as mercaptans, examples of which include mercaptoethanol, mercaptosuccinic acid, 3-mercaptopropyltrimethoxysilane and, in particular, dodecyl mercaptan. (In view of the nature of the use of the polymers A in accordance with the invention it is sensible to carry out extensive removal of volatile impurities such as residual monomers from the polymers A prior to use.)

(Once prepared, the polymers A can be processed further to give the mixtures that are used in accordance with the invention, with the polymers B, advantageously by incorporating the liquid polymer A directly by emulsification into a dispersion of the polymer B, with monitoring and adjustment of the pH.) Especially in the case of carboxyl-containing polymers A it is often also advantageous to process the polymer A under alkaline conditions by the customary methods of polymer emulsification to give a secondary dispersion which can then, for example, readily be stirred together with the aqueous dispersion of the polymer B. The proportions of the polymers A and B in the resulting mixture M can be very different, although it is usually judicious for the polymer A to be present in a smaller amount than the polymer B in the mixture of A+B. The mixture of A+B advantageously contains from 1 to 49 parts of polymer A and from 51 to 99 parts of polymer B, preferably from 25 to 45% by weight of the polymer A and from 55 to 75% by weight of the polymer B, based in each case on the 100% polymers.

The (polymers B) are (meth)acrylate copolymers having a glass transition temperature of from −50 to +50° C., in particular of below −25° C. and, preferably, of below −30° C. They (preferably have molecular weights $M_n$ of more than 20,000.) Highly suitable polymers B contain at least 50 and, in particular, from 60 to 100% by weight of at least one ester of acrylic acid and/or of methacrylic acid, in copolymerized form. Examples of suitable esters are $C_1$–$C_{12}$-alkyl acrylates, such as methyl, ethyl, n-propyl, n-butyl, 2-ethylhexyl, decyl and dodecyl acrylate and also n-butyl methacrylate and n-hexyl methacrylate.

Preference is given to those monomers which form homopolymers having glass transition temperatures of from −40° C. to −60° C.

Preferred polymers B contain from 0.5 to 10 and, in particular, from 0.5 to 5% by weight of a copolymerizable, olefinically unsaturated carboxylic acid having 3 to 5 C atoms or the anhydrides or monoesters thereof in copolymerized form, such as acrylic acid, methacrylic acid, maleic acid, fumaric acid, itaconic acid and maleic anhydride or mono-n-butyl maleate.

Further comonomers which are particularly suitable for the polymers B are the comonomers specified above for the polymers A for b) and c).

Examples of highly suitable copolymers B are those which in addition to ≧50% by weight of alkyl(meth)acrylates, methyl methacrylate, vinyl acetate, vinyl propionate and/or styrene, in an amount of up to 30% by weight, also contain carboxyl- and possibly hydroxyl-containing monomers in an amount of in each case not more than 5% by weight, the copolymers B having glass transition temperatures of below 25° C. (The polymers B can be prepared advantageously by solution polymerization and subsequently converted conventionally into polymer dispersions;) (preferably, however, they are prepared by emulsion polymerization, so that aqueous polymer dispersions can be obtained directly. The preparation of the polymers B is described in EP-A 743 965, the relevant content of which is incorporated herein by reference.) The solids content of the resulting polymer dispersions is, in particular, from 40 to 75% by weight.

For the use of mixture M comprising the polymers A and B, which can take place as indicated above, the mixture is admixed with the (mineral fillers, such as finely ground or precipitated chalks having a mean particle diameter of in general from 2 to 50 μm or quartz flour) having a mean particle diameter of from 3 to 50 μm, and also wetting agents or dispersants, thickeners, and, if desired, further additives, such as antifoams and preservatives. The water content of the ready-to-use compositions is in general from 7 to 50% by weight, in particular from 10 to 30% by weight, based on the overall aqueous formulation.

The filler-containing aqueous formulations with the mixture M comprising the polymers A and B is suitable as a single-side adhesive for floor coverings of, for example, polyvinyl chloride in configurations as multilayer coverings or homogeneous coverings, foam coverings with a textile backing, for example jute, polyester nonwoven, rubber coverings, textile coverings with various backings such as polyurethane foam, styrene-butadiene copolymer foam, a textile secondary backing, needlefelt floor coverings, polyolefin coverings or linoleum coverings, on substrates such as wood, screeding, concrete, ceramic tiles, metal substrates or other suitable substrates.

The aqueous formulation with the polymer mixture used in accordance with the invention can be applied to a substrate using, for example, a toothed applicator. After customary venting, the floor covering is then laid. In terms of processing the novel compositions resemble the solvent-containing single-side adhesives. The compositions used in accordance with the invention feature a good level of performance properties such as peel strength, shear strength, wet bonding capacity and dry gripping capacity and a high heat stability.

The following examples and comparison experiments illustrate in more detail the methods of the invention without limiting them. Unless otherwise indicated, parts and percentages are by weight. The K values, glass transition temperatures and $M_w/M_n$ ratios were determined and/or calculated as indicated in the text above.

EXAMPLE 1

Use for Floor Coverings

A 55% aqueous dispersion of a copolymer comprising 40% n-butyl acrylate, 30% 2-ethylhexyl acrylate and 30% vinyl acetate having a glass transition temperature of −25° C. (polymer B) was blended with 40% (based on the polymer B of the dispersion) of a 100% copolymer comprising 90 parts n-butyl acrylate and 10 parts acrylic acid having a K value of 12.5 and a glass transition temperature of −33° C. (polymer A) and the pH of the resulting mixture was adjusted with ammonia to 7.5. Subsequently, finely divided calcium carbonate was added to the mixture with stirring so that the weight ratio of the polymers (polymer A+polymer B) to filler was 45:55. After venting for 24 hours, a PVC covering and a rubber covering (Norament) were laid. The amount applied of the single-sided adhesive was 300 g/m². The peel strength, heat stability, wet bonding capacity and dry gripping capacity were tested in comparison with a conventional, resin-containing, single-side adhesive (Comparison Experiment 1). The results of the test are shown in Table 1

Comparison Experiment 1

Use for Floor Coverings

The procedure was as in Example 1 except that for comparison purposes a conventional single-side adhesive for floor coverings, having the following composition, was processed and tested:

35.0 parts of Acronal® V 302; pH 7.5, a polymer based on acrylates with a $T_g$ of −20° C.,
0.5 parts of Emulphor® OPS 25, an emulsifier
0.2 parts of Lumiten® EL, an antifoam
8.5 parts of 2% strength Latekoll D solution, a thickener
2.0 parts of Plastilit® 3431, a plasticizer (monophenyl glycol ether)
20.0 parts of resin melt (80 parts of colophony resin and 20 parts of Plastilit 3431)
33.8 parts of calcite (calcium carbonate)
Solids content: 75.6% resin content: 16.0%
Filler content: 33.8% polymer content: 19.3%

TABLE 1

| | Testing data relating to use for floor coverings | | | |
| --- | --- | --- | --- | --- |
| | Example 1 | | Comparison Experiment 1 | |
| Covering | PVC | Rubber | PVC | Rubber |
| Peel strength (N/cm) Venting time | | | | |
| 10 minutes | 31 | 34 | 24 | 27 |
| 30 minutes | 20 | 21 | 21 | 16 |
| Heat stability (minutes) | 150 cohesion | | 80 cohesion | |

TABLE 1-continued

Testing data relating to use for floor coverings

|  | Example 1 | | Comparison Experiment 1 | |
|---|---|---|---|---|
| Covering | PVC | Rubber | PVC | Rubber |
| Wet bonding capacity (N/5 cm) | | | | |
| 15 minutes | 6 cohesion | | 8 cohesion | |
| 30 minutes | 33 cohesion | | 20 cohesion | |
| Dry gripping capacity (N/5 cm) | | | | |
| 30 minutes | 38 cohesion | | 29 cohesion | |

Test method for wet bonding capacity

The substrates (Glasal 2000 (cement fiber slab)(500× 200×8 mm) and Freudenberg Studio needle-punched web (200×50 mm NFC strips)), like the single-side adhesive, were conditioned under standard climatic conditions (23° C., 50% relative humidity) for 24 hours. Single-sided adhesive is applied using a 2 mm DIN peel knife in the lengthwise direction onto the Glasal 2000 and, after 10 minutes of venting, the needle-punched web coverings (NFC strips) are laid with their reverse side into the bed of adhesive and are pressed on by rolling back and forward 3 times with a 2.5 kg roller. The coverings are peeled off with a stripper at the time intervals indicated, and the increase in the peel resistance in N/5 cm is determined. The rate used for testing is 725 mm/minute. For evaluation, the mean of two test specimens in N/5 cm is formed and the aspect at break is assessed.

Test method for Dry Gripping Capacity

The substrates (Glasal 2000 (500×200×8 mm) and Pegulan B1 test covering (200×50 mm)) and the single-side adhesive are conditioned under standard climatic conditions (23° C., 50% relative humidity) for 24 hours. The single-sided adhesive is applied using a 1 mm DIN shear knife in the lengthwise direction to Glasal 2000 and, after 10 to 45 minutes of venting, the PVC is laid with its reverse side into the bed of single-sided adhesive and is pressed on by rolling back and forward 3 times with a 2.5 kg roller. Testing is carried out by peeling with the stripper, and the peel resistance in N/5 cm is determined. The speed used for testing is 725 mm/minute. Evaluation: mean of test specimens in N/5 cm, assessment of aspect at break.

Test method for Heat Stability

The substrates (Glasal 2000 (60×50×8 mm) and Pegulan B1 test covering (60×50 mm)) and the single-side adhesive are conditioned under standard climatic conditions (23° C., 50% relative humidity) for 24 hours. The single-side adhesive is applied using a 1 mm DIN shear knife in the transverse direction to Glasal 2000. The PVC covering is bonded with the aid of a bonding stencil so as to give a bonding area of 20×50 mm. After 5 minutes of venting, the PVC test covering is laid and is pressed on with a manual press and a pressure of 0.3 N/mm² for 10 seconds. After the test specimen has been stored for a period of 14 days under standard climatic conditions, testing takes place in a thermal cabinet at 50° C. under a weight strain of 2 kg (±1). Before beginning of testing the test specimens are thermally conditioned for 30 minutes. Evaluation: mean of 5 test specimens in minutes, assessment of aspect at break.

Test method for peel strength in accordance with DIN 16860

The substrates (Glasal 2000 (150×50×8 mm) and Pegulan B1 test covering (250×50 mm)) and the single-side adhesive are conditioned under standard climatic conditions (23° C., 50% relative humidity) for 24 hours. The single-side adhesive is applied using a 2 mm DIN peel knife in the transverse direction to Glasal 2000. The PVC covering is bonded by its reverse side to the Glasal 2000 in such a way that 3 sides are flush and the covering overhangs on one side. After venting for 10 and 60 minutes the test covering is pressed on with a manual press and a pressure of 0.05 N/mm² for 10 seconds. The test specimen is stored under standard climatic conditions for 14 days and then peeling is carried out, with the speed used for testing being 100 mm/minute. Evaluation: mean of 5 specimens in N/cm; assessment of aspect at break.

EXAMPLE 2

Use as Sealant 300 parts of a 65% aqueous dispersion of a copolymer comprising 87% n-butyl acrylate and 13% methyl methacrylate and having a glass transition temperature of −40° C. (polymer B) are adjusted with 20% strength sodium hydroxide solution to a pH of 8.2 and the resulting dispersion is stirred together with 100 parts of a 100% copolymer comprising 95.05% n-butyl acrylate and 4.95% acrylic acid having a K value of 11.5, a glass transition temperature of −41° C. and an $M_w/M_n$ ratio of 2.1 (polymer A) at 6000 rpm for 30 minutes using the Dilexer disk. The mixture was then again adjusted to a pH of 8 using sodium hydroxide solution. Overnight the pH dropped from 8.2 to 7.5. The mixture was again adjusted to a pH of 8.2 using sodium hydroxide solution. It could be spread smoothly. While stirring with a planetary mixer, 15 parts of titanium dioxide, 3 parts of sulfated octylphenol ethoxylate with 25 mol of ethylene oxide, 2 parts of a sodium salt of polyacrylic acid, as pigment dispersant, and 580 parts of calcium carbonate were incorporated. The test data for the sealant produced in this way are shown in Table 2.

Comparison Experiment 2

The procedure of Example 2 was repeated but incorporating 100 parts of di-2-ethylhexyl phthalate as plasticizer instead of 100 parts of polymer A. The test data for the resulting composition are shown in Table 2.

TABLE 2

Test data for the sealant

|  | Example 2 | Comparison Experiment 2 |
|---|---|---|
| Stability DIN 52454 | good | good |
| Volume loss in % according to DIN 52451 | 18 | 18 |
| Extension in % according to DIN 53504 | 445 | 385 |
| Tensile stress in N/mm² (Standard rod S2) | | |
| 100% | 0.29 | 0.45 |
| 200% | 0.35 | 0.59 |
| 300% | 0.35 | 0.59 |
| Resilience in % according to DIN 52458 | 52 | 58 |
| Storage stability 4 weeks at 50° C. | good | good |
| Residual tack after 4 weeks | tack-free | slightly tacky |
| Adhesion to wood | good | good |
| Adhesion to paving slab | very good | good |

What is claimed is:
1. A method of bonding tiles or floor coverings or both to a substrate, which comprises applying to said substrate an aqueous acrylate copolymer dispersion having a filler content of at least 20% by weight and which is free from major amounts of organic solvents, plasticizers, and modified or unmodified natural resins of low molecular weight, wherein said aqueous dispersion comprises at least 20% by weight of filler, and of a polymer mixture M, which comprises:

a) a polymer A having a K value from 5 to 30 and a glass transition temperature of below −10° C., which is prepared by bulk or solution polymerization and wherein at least 50% by weight of the polymer A comprises co-polymerized units of at least one ester of acrylic acid; and b) a polymer B which is an acrylic co-polymer having a glass transition temperature from −50 to 50° C. and which polymer is prepared by emulsion polymerization and has a number average molecular weight, $M_n$, of more than 20,000.

2. The process of claim 1, wherein the polymer A is a liquid polymer which is optionally in the form of an aqueous secondary dispersion.

3. The process of claim 1, wherein the polymer A has a glass transition temperature of from −20 to −60° C.

4. The process of claim 1, wherein the polymer A comprises:

a) from 70–99% by weight of acrylates which form homopolymers having glass transition temperatures of from −30 to −60° C., b) from 1–30% by weight of carboxyl- or hydroxyl-containing monomers or both, and c) from 0–29% by weight of other olefinically unsaturated monomers, in copolymerized form, and has a K value of from 5–55.

5. The process of claim 1, wherein the polymer A comprises, in copolymerized form:

a) from 85–98% by weight of acrylates which form homopolymers having a glass transition temperature of from −40 to −60° C., and b) from 2–15% by weight of carboxyl- and optionally hydroxyl-containing monomers.

6. The process of claim 1, wherein the polymer A has a polydispersity $M_w/M_n$ of from 1 to 5.

7. The process of claim 1, wherein the polymer B contains in copolymerized form at least 50% by weight of acrylates or methacrylates or both and has a glass transition temperature of from −25 to −60° C.

8. The process of claim 1, wherein the mixture M is prepared by emulsifying the polymer A under alkaline conditions and then mixing or emulsifying in an aqueous emulsion of the polymer B, or the polymer A is emulsified directly in the aqueous dispersion of the polymer B.

9. The process of claim 1, wherein the aqueous acrylate copolymer dispersion comprises less than 3% by weight of said organic solvents, plasticizers, and natural resins.

10. The process of claim 1, wherein the aqueous acrylate copolymer dispersion comprises less than 1% by weight of said organic solvents, plasticizers, and natural resins.

11. A method of producing seals or coatings or both on a substrate, which comprises applying to said substrate an aqueous acrylate copolymer dispersion having a filler content of at least 20% by weight and which is free from major amounts of organic solvents, plasticizers, and modified or unmodified natural resins of low molecular weight, wherein said aqueous dispersion comprises at least 20% by weight of filler, and of a polymer mixture M, which comprises:

a) a polymer A having a K value from 5 to 30 and a glass transition temperature of below −10° C., which is prepared by bulk or solution polymerization and wherein at least 50% by weight of the polymer A comprises co-polymerized units of at least one ester of acrylic acid; and b) a polymer B which is an acrylic co-polymer having a glass transition temperature from −50 to 50° C. and which polymer is prepared by emulsion polymerization and has a number average molecular weight, $M_n$, of more than 20,000.

12. The process of claim 11, wherein the polymer A is a liquid polymer which is optionally in the form of an aqueous secondary dispersion.

13. The process of claim 11, wherein the polymer A has a glass transition temperature of from −20 to −60° C.

14. The process of claim 11, wherein the polymer A comprises:

a) from 70–99% by weight of acrylates which form homopolymers having glass transition temperatures of from −30 to −60° C., b) from 1–30% by weight of carboxyl- or hydroxyl-containing monomers or both, and c) from 0–29% by weight of other olefinically unsaturated monomers, in copolymerized form, and has a K value of from 5–55.

15. The process of claim 11, wherein the polymer A comprises, in copolymerized form:

a) from 85–98% by weight of acrylates which form homopolymers having a glass transition temperature of from −40 to −60° C., and b) from 2–15% by weight of carboxyl- and optionally hydroxyl-containing monomers.

16. The process of claim 11, wherein the polymer A has a polydispersity $M_w/M_n$ of from 1 to 5.

17. The process of claim 11, wherein the polymer B contains in copolymerized form at least 50% by weight of acrylates or methacrylates or both and has a glass transition temperature of from −25 to −60° C.

18. The process of claim 11, wherein the mixture M is prepared by emulsifying the polymer A under alkaline conditions and then mixing or emulsifying in an aqueous emulsion of the polymer B, or the polymer A is emulsified directly in the aqueous dispersion of the polymer B.

19. The process of claim 11, wherein the aqueous acrylate copolymer dispersion comprises less than 3% by weight of said organic solvents, plasticizers, and natural resins.

20. The process of claim 11, wherein the aqueous acrylate copolymer dispersion comprises less than 1% by weight of said organic solvents, plasticizers, and natural resins.

21. An aqueous dispersion of a polymer mixture M, comprising:

a) a polymer A having a K value of from 5 to 30 and a glass transition temperature of below −10° C., which is prepared by bulk or solution polymerization and wherein at least 50% by weight of said polymer A comprises co-polymerized units of at least one ester of acrylic acid; and b) a polymer B which is an acrylic co-polymer having a glass transition temperature from −50 to 50° C. and which polymer is prepared by emulsion polymerization and has a number average molecular weight, $M_n$, of more than 20,000, said aqueous dispersion containing at least 20% by weight of filler, and being free from major amounts of organic solvents, plasticizers and modified or unmodified natural resins of low molecular weight, wherein the polymer mixture M is prepared by either:
- i) emulsifying the polymer A under alkaline conditions to give a secondary dispersion, and mixing a secondary dispersion with an aqueous dispersion of the polymer B; or
- ii) emulsifying the polymer A directly into an aqueous dispersion of the polymer B.

22. The aqueous dispersion of claim 21, which comprises less than 3% by weight of said organic solvents, plasticizers, and natural resins.

23. The aqueous dispersion of claim 21, which comprises less than 1% by weight of said organic solvents, plasticizers, and natural resins.

24. The aqueous dispersion of claim 21, wherein the polymer A is a liquid polymer which is optionally in the form of an aqueous secondary dispersion.

25. The aqueous dispersion of claim 21, wherein the polymer A has a glass transition temperature of from −20 to −60° C.

26. The aqueous dispersion of claim 21, wherein the polymer A comprises:
- a) from 70–99% by weight of acrylates which form homopolymers having glass transition temperature of from −30 to −60° C.,
- b) from 1–30% by weight of carboxyl- or hydroxyl-containing monomers or both, and
- c) from 0–29% by weight of other olefinically unsaturated monomers, in copolymerized form, and has a K value of from 5–55.

27. The aqueous dispersion of claim 21, wherein the polymer A comprises, in copolymerized form:
- a) from 85–98% by weight of acrylates which form homopolymers having a glass transition temperature of from −40 to −60° C., and
- b) from 2–15% by weight of carboxyl- and optionally hydroxyl-containing monomers.

28. The aqueous dispersion of claim 21, wherein the polymer B contains in copolymerized form at least 50% by weight of acrylates or methacrylates or both, and has a glass transition temperature of from −25 to 60° C.

* * * * *